United States Patent
Okuda

(10) Patent No.: US 9,347,500 B2
(45) Date of Patent: May 24, 2016

(54) VEHICLE CONTROL DEVICE

(75) Inventor: Tadashi Okuda, Hadano (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 17 days.

(21) Appl. No.: 13/501,302

(22) PCT Filed: Oct. 13, 2010

(86) PCT No.: PCT/JP2010/067906
§ 371 (c)(1),
(2), (4) Date: Apr. 11, 2012

(87) PCT Pub. No.: WO2011/046124
PCT Pub. Date: Apr. 21, 2011

(65) Prior Publication Data
US 2012/0199437 A1  Aug. 9, 2012

(30) Foreign Application Priority Data
Oct. 14, 2009  (JP) .................. 2009-237194

(51) Int. Cl.
| F16D 25/00 | (2006.01) |
| F16D 25/08 | (2006.01) |
| B60K 6/48 | (2007.10) |
| B60K 6/547 | (2007.10) |
| B60W 10/02 | (2006.01) |
| B60W 10/06 | (2006.01) |
| B60W 10/08 | (2006.01) |
| B60W 20/00 | (2016.01) |
| F16D 48/04 | (2006.01) |

(52) U.S. Cl.
CPC .............. *F16D 25/087* (2013.01); *B60K 6/48* (2013.01); *B60K 6/547* (2013.01); *B60W 10/02* (2013.01); *B60W 10/06* (2013.01); *B60W 10/08* (2013.01); *B60W 20/00* (2013.01); *F16D 48/04* (2013.01); *B60W 2510/0208* (2013.01); *F16D 2500/1066* (2013.01); *F16D 2500/3024* (2013.01); *F16D 2500/70406* (2013.01); *Y02T 10/6221* (2013.01); *Y02T 10/6286* (2013.01)

(58) Field of Classification Search
USPC ............................................ 192/85.57, 85.63
See application file for complete search history.

(56) References Cited

U.S. PATENT DOCUMENTS

| 6,176,808 B1 * | 1/2001 | Brown et al. .................. 477/5 |
| 6,499,577 B2 * | 12/2002 | Kitamoto et al. .......... 192/85.63 |
| 8,092,343 B2 * | 1/2012 | Leibbrandt et al. ........... 477/174 |

FOREIGN PATENT DOCUMENTS

JP          11-82561 A      3/1999

* cited by examiner

*Primary Examiner* — Colby M Hansen
*Assistant Examiner* — Stacey Fluhart
(74) *Attorney, Agent, or Firm* — Foley & Lardner LLP

(57) ABSTRACT

A first clutch CL1 is disposed between engine Eng and left and right rear wheels RL, RR, and control of disengaging first clutch CL1 is performed by setting line pressure PL as an original pressure and executing F/B control of a piston stroke position. In this FR hybrid vehicle, when disengaging first clutch CL1, line pressure increase control to increase line pressure PL to a value higher than a reference line pressure in advance is started at least before a piston pressure reaches the reference line pressure, and line pressure PL is returned to the reference line pressure when the piston pressure is reduced during this disengagement operation.

4 Claims, 9 Drawing Sheets

VEHICLE CONTROL DEVICE

TECHNICAL FIELD

The present invention relates to a control apparatus of a vehicle including a hydraulic clutch disposed between a driving source and driving wheels, the control apparatus being configured to set a piston pressure as a clutch disengagement hydraulic pressure which is produced from a line pressure as an original pressure by a clutch hydraulic control valve.

BACKGROUND ART

Conventionally, there has been proposed an automatic clutch control apparatus in which in a case where an actual clutch stroke does not reach a target clutch disengagement stroke and it is judged that flow rate compensation is necessary, a flow rate of fluid to be supplied to a clutch is increased to compensate for lack of flow rate by turning on a pump motor (for instance, see Patent Literature 1).

CITATION LIST

Patent Literature

Patent Literature 1: Japanese Patent Application Unexamined Publication No. 11-82561

SUMMARY OF INVENTION

However, in the automatic clutch control apparatus of the conventional art, a detection value of the actual clutch stroke is received as feedback information, and after it is recognized that the detection value of the actual clutch stroke does not reach the target clutch disengagement stroke, the flow rate of fluid is increased. Thus, the conventional automatic clutch control apparatus performs feedback control using a closed loop circuit. Therefore, even in a case where the line pressure as an original pressure of a clutch hydraulic control valve must be increased when flow rate compensation is necessary, there will occur a hydraulic response delay in rise in the line pressure.

As a result, there occurs a problem as follows. Upon disengagement of the clutch in which the flow rate compensation is necessary, a delay in rise in necessary flow rate of fluid (a necessary hydraulic pressure) is caused to thereby prolong the stroke required time from outputting a clutch disengagement command until a clutch stroke position reaches a target clutch disengagement position, thereby causing deterioration in response of clutch disengagement.

The present invention has been made in view of the above problem. An object of the present invention is to provide a control apparatus of a vehicle which is capable of suppressing unnecessary energy loss and enhancing a response of clutch disengagement regardless of variation in clutch disengagement necessary pressure (necessary pressure to disengage a clutch), upon disengaging the clutch.

In order to achieve the above object, the vehicle according to the present invention is provided with a hydraulic clutch disposed between a driving source and driving wheels and an automatic transmission which is driven and controlled by a hydraulic pressure produced from a line pressure as an original pressure. The hydraulic clutch is actuated by a piston pressure that is produced from the line pressure as an original pressure by a clutch hydraulic control valve. The hydraulic clutch is disengaged by operating a clutch hydraulic actuator to make stroke by controlling the piston pressure as a clutch disengagement hydraulic pressure such that an actual piston stroke position is conformed with a target position.

In a control apparatus of this vehicle, a clutch disengagement control section is provided. The clutch disengagement control section is configured such that upon disengaging the hydraulic clutch, line pressure increase control to increase the line pressure to a value higher than a reference line pressure that is the line pressure determined on the basis of a necessary hydraulic pressure to ensure an operation except for a disengagement operation of the hydraulic clutch, is started at least before the piston pressure reaches the reference line pressure, and the line pressure is reduced when the piston pressure is reduced during the disengagement operation.

DESCRIPTION OF EMBODIMENTS

In the following, best modes to realize a control apparatus of a vehicle according to the present invention are explained by referring to the accompanying drawings.

First Embodiment

Figure 1:
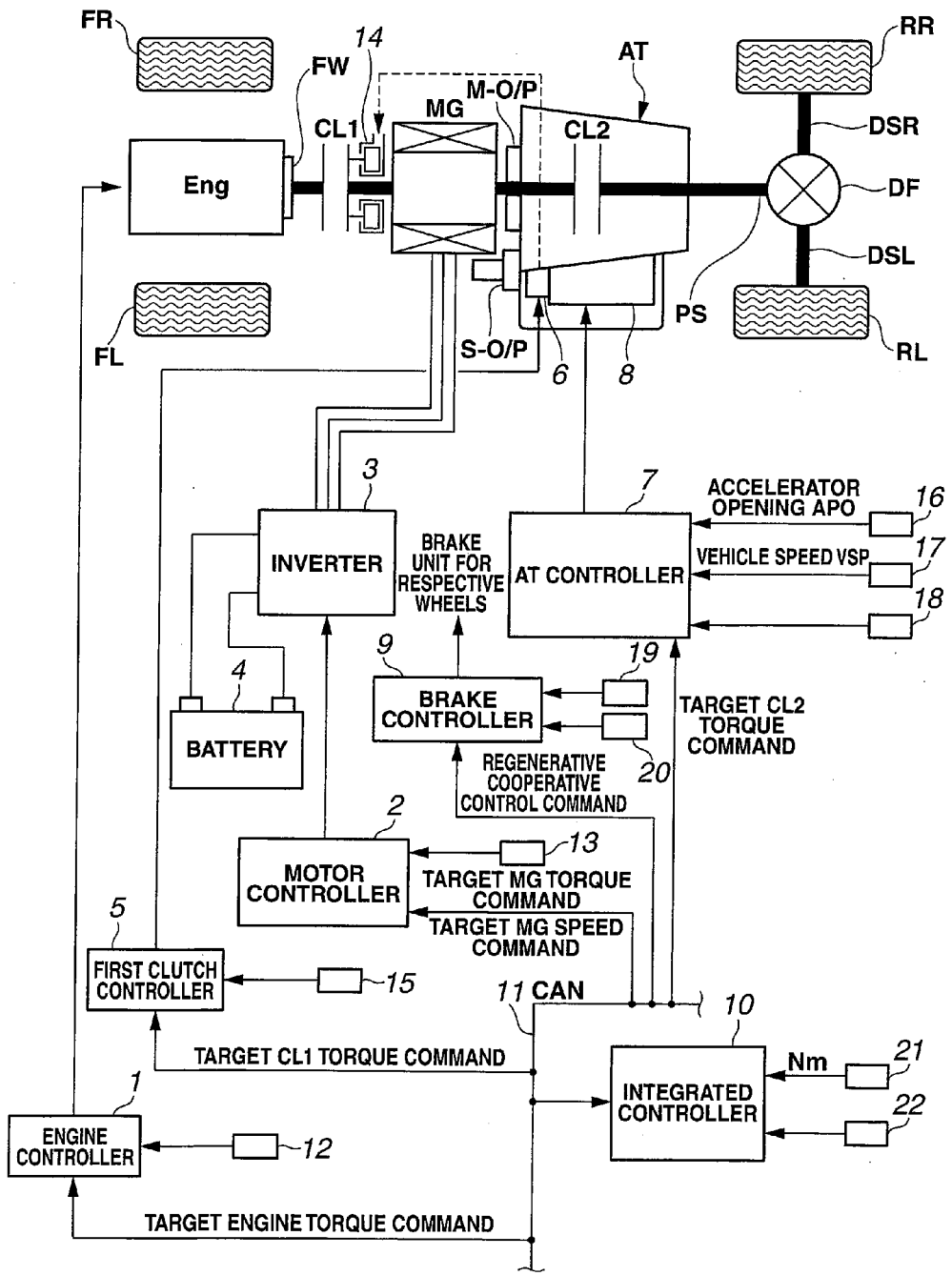
FIG. 1 is a whole system diagram showing a rear-wheel-drive FR hybrid vehicle (an example of a vehicle) to which a control apparatus according to a first embodiment of the present invention is applied.

First, a construction of the control apparatus according to the first embodiment is explained. FIG. 1 is a whole system diagram showing a rear-wheel-drive FR hybrid vehicle (an example of a vehicle) to which the control apparatus according to the first embodiment of the present invention is applied. In the following, the whole system construction is explained by referring to FIG. 1.

As shown in FIG. 1, a drive line of the FR hybrid vehicle in the first embodiment includes engine Eng (driving source), flywheel FW, first clutch CL1 (hydraulic clutch), motor/generator MG, second clutch CL2, automatic transmission AT, propeller shaft PS, differential DF, left drive shaft DSL, right drive shaft DSR, left rear wheel RL (driving wheel), and right rear wheel RR (driving wheel). Reference marks FL, FR, M-O/P, and S-O/P denote a left front wheel, a right front wheel, a main oil pump, and a sub-oil pump, respectively.

Engine Eng is a gasoline engine or a diesel engine. Engine start control, engine stop control, etc. are carried out in accordance with an engine control command outputted from engine controller 1. An engine output shaft is provided with flywheel FW.

First clutch CL1 is disposed between engine Eng and motor/generator MG. First clutch CL1 is a running mode selecting clutch which is disengaged when an electric vehicle running mode (hereinafter referred to as "EV mode") is selected, and is engaged when a hybrid vehicle running mode (hereinafter referred to as "HEV mode") is selected. A normal close dry type single plate clutch is used as the first clutch CL1.

Motor/generator MG is disposed between first clutch CL1 and automatic transmission AT, and has a function of operating as a motor and a function of operating as a generator. A three-phase alternating current synchronous motor/generator including a rotor in which permanent magnets are embedded and a stator on which coils are wound, is used as the motor/generator MG.

Second clutch CL2 is disposed between motor/generator MG and left and right rear wheels RL, RR. For instance, second clutch CL2 is a clutch provided in order to absorb torque variation by being brought into a slip engagement condition when transmission torque is varied as at the time of starting the engine. Second clutch CL2 is not additionally provided, but is provided by selecting a friction engagement element disposed on a torque transmission path from a plurality of friction engagement elements which are to be engaged at the speed (the gear stage) selected in automatic transmission AT.

Automatic transmission AT is, for instance, a stepwise variable transmission which stepwise varies multiple speeds such as seven forward speeds and one reverse speed, or a continuously variable transmission which steplessly varies a transmission ratio. A transmission output shaft is connected to left and right rear wheels RL, RR via propeller shaft PS, differential DF, left drive shaft DSL and right drive shaft DSR.

Main oil pump M-O/P is disposed on an input shaft of automatic transmission AT, and is a mechanical oil pump which is mechanically operated to make a pump action. Sub-oil pump S-O/P is disposed on a unit housing or the like, and is an electric oil pump that is operated by an electric motor when an oil amount discharged by main oil pump M-O/P is zero, for instance, in a vehicle stop state in the "EV mode" in which first clutch CL1 is in the disengagement state, or when an oil amount discharged by main oil pump M-O/P is less than a necessary oil amount.

Next, a control system of the hybrid vehicle is explained. As shown in FIG. 1, the control system of the FR hybrid vehicle in the first embodiment includes engine controller 1, motor controller 2, inverter 3, battery 4, first clutch controller 5, first clutch hydraulic control valve 6, AT controller 7, AT control valve 8, brake controller 9, and integrated controller 10. Respective controllers 1, 2, 5, 7, 9 are connected with integrated controller 10 through CAN communication line 11 such that they can communicate with one another to exchange information therebetween.

Engine controller 1 receives engine rotation speed information from engine rotation speed sensor 12, a target engine torque command from integrated controller 10, and other necessary information. Engine controller 1 outputs commands to control engine operating points (Ne, Te) to a throttle valve actuator of engine Eng and the like (engine control).

Motor controller 2 receives information from resolver 13 which detects a rotor rotation position of motor/generator MG, a target MG torque command and a target MG rotation speed command from integrated controller 10, and other necessary information. Motor controller 2 outputs commands to control motor operating points (Nm, Tm) of motor/generator MG to inverter 3 (motor control). Further, motor controller 2 monitors battery SOC indicative of a charging capacity of battery 4.

First clutch controller 5 receives sensor information from piston stroke sensor 15 which detects a piston stroke position of first clutch hydraulic actuator 14, a target CL1 torque command from integrated controller 10, and other necessary information. First clutch controller 5 outputs commands to control engagement, slip engagement, disengagement of first clutch CL1 to first clutch hydraulic control valve 6 (first clutch control).

AT controller 7 receives information from accelerator opening sensor 16, vehicle speed sensor 17, and other sensors 18 (a transmission input rotation speed sensor, an inhibitor switch, etc.). During running in a D range, AT controller 7 retrieves an optimal speed (gear stage) on the basis of a position of an operating point on a shift map which is determined in accordance with accelerator opening APO and vehicle speed VSP, and outputs a control command to obtain the retrieved speed to AT control valve 8 (shift control). In response to input of a target CL2 torque command from integrated controller 10, AT controller 7 outputs a slip engagement control command for second clutch CL2 to AT control valve 8 (second clutch control). Further, AT controller 7 performs a hydraulic shift operation of automatic transmission AT, and upon carrying out an operation of releasing a hydraulic pressure in first clutch CL1, AT controller 7 executes control of line pressure PL as an original pressure to determine a maximum pressure.

Brake controller 9 receives sensor information from wheel speed sensor 19 that detects wheel speed of each of four wheels, and from brake stroke sensor 20, a regenerative cooperative control command from integrated controller 10, and other necessary information. Further, in a case where a requested braking force determined on the basis of brake stroke BS when a brake pedal is depressed cannot be achieved with only a regenerative braking force, brake controller 9 serves to supplement the requested braking force by a lacking amount thereof with a mechanical braking force (regenerative cooperative brake control).

Integrated controller 10 has functions of managing energy consumption of the vehicle as a whole and efficiently running the vehicle. Integrated controller 10 receives necessary information from motor rotation speed sensor 21 that detects motor rotation speed Nm and from other sensors/switches 22, and information through CAN communication line 11. Integrated controller 10 outputs the target engine torque command to engine controller 1, the target MG torque command and the target MG rotation speed command to motor controller 2, the target CL1 torque command to first clutch controller 5, the target CL2 torque command to AT controller 7, and the regenerative cooperative control command to brake controller 9 (integrated control).

Figure 2:
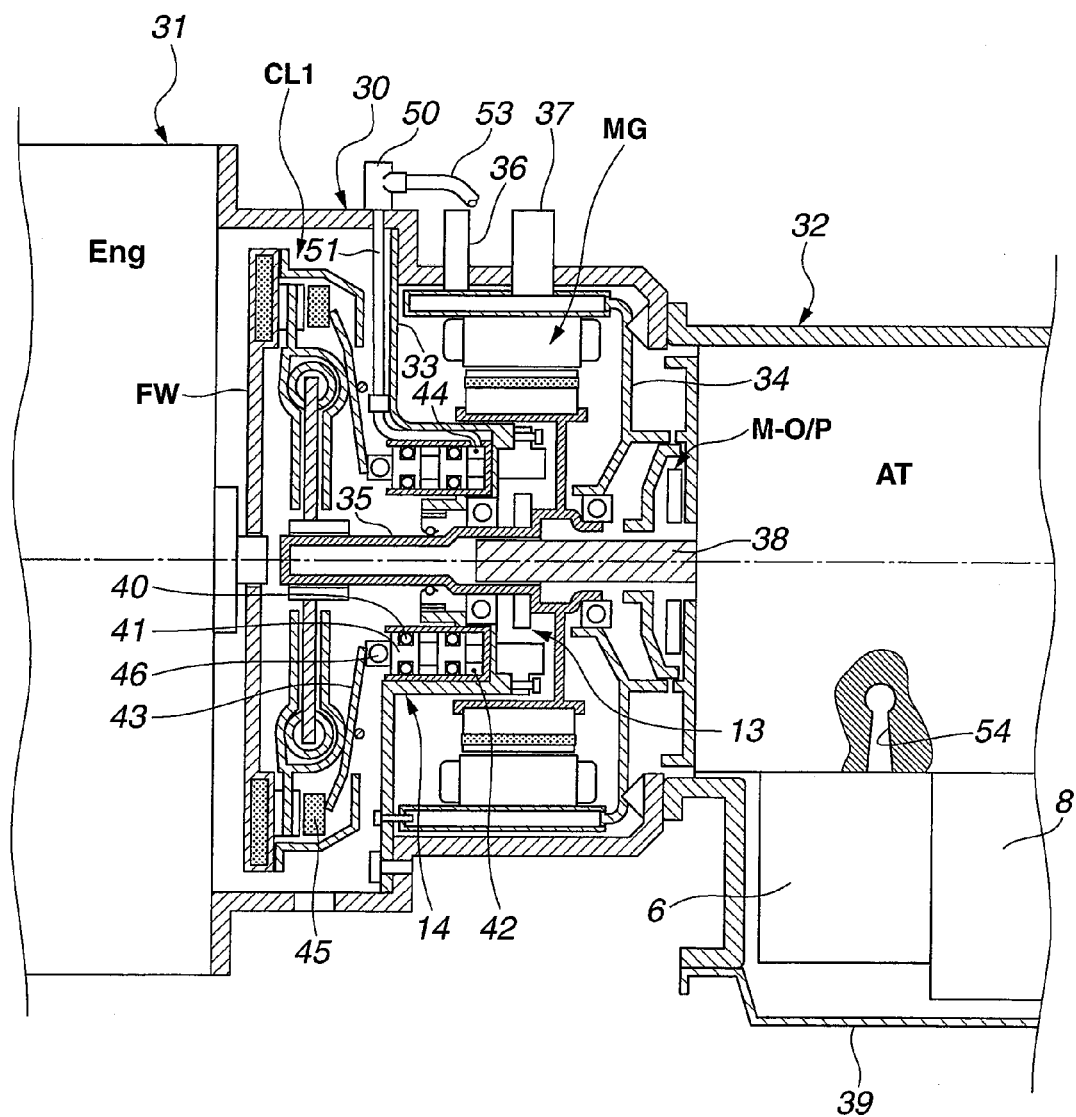
FIG. 2 is a sectional view showing a construction of a clutch and motor unit section in which a first clutch CL1 (an example of a hydraulic clutch) to be controlled to come into engagement and disengagement by the control apparatus according to the first embodiment is disposed.

Next, referring to FIG. 2 to FIG. 5, a first clutch control system to engage and disengage first clutch CL1 is explained. As shown in FIG. 2, the clutch and motor unit section of the first embodiment includes engine Eng, flywheel FW, first clutch CL1 (hydraulic clutch), motor/generator MG, main oil pump M-O/P, automatic transmission AT, and unit housing 30.

Unit housing 30 is connected to engine block 31 of engine Eng at a front side thereof, and connected to transmission case 32 of automatic transmission AT at a rear side thereof. An inside of unit housing 30 is divided into three chambers by motor cover 33 and stator housing 34. Flywheel FW and first clutch CL1 are disposed within a first chamber defined by engine Eng and motor cover 33. Motor/generator MG is disposed within a second chamber defined by motor cover 33 and stator housing 34. Main oil pump M-O/P is disposed within a third chamber defined by stator housing 34 and automatic transmission AT.

First clutch CL1 is disposed between flywheel FW and hollow motor shaft 35 of motor/generator MG. Motor/generator MG includes resolver 13 disposed in an inside position of the rotor, and high-voltage harness terminal 36 and cooling water inlet/outlet port 37 which extend through unit housing 30. Main oil pump M-O/P is driven by transmission input shaft 38 coupled to hollow motor shaft 35.

Figure 3:
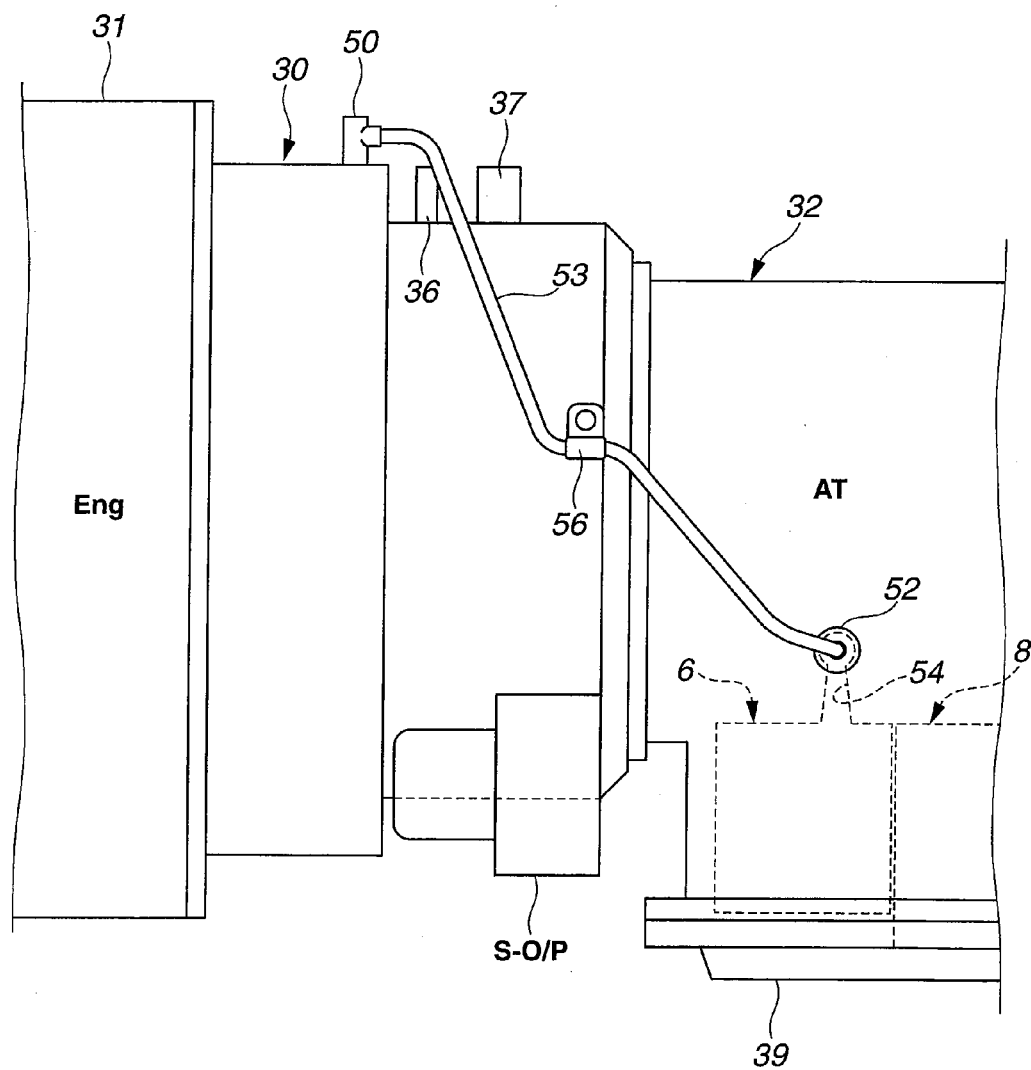
FIG. 3 is an outer appearance diagram showing an outer pipe connecting a first clutch hydraulic actuator that controls the first clutch CL1 to come into engagement and disengagement and a first clutch hydraulic control valve in the first embodiment.
Figure 4:
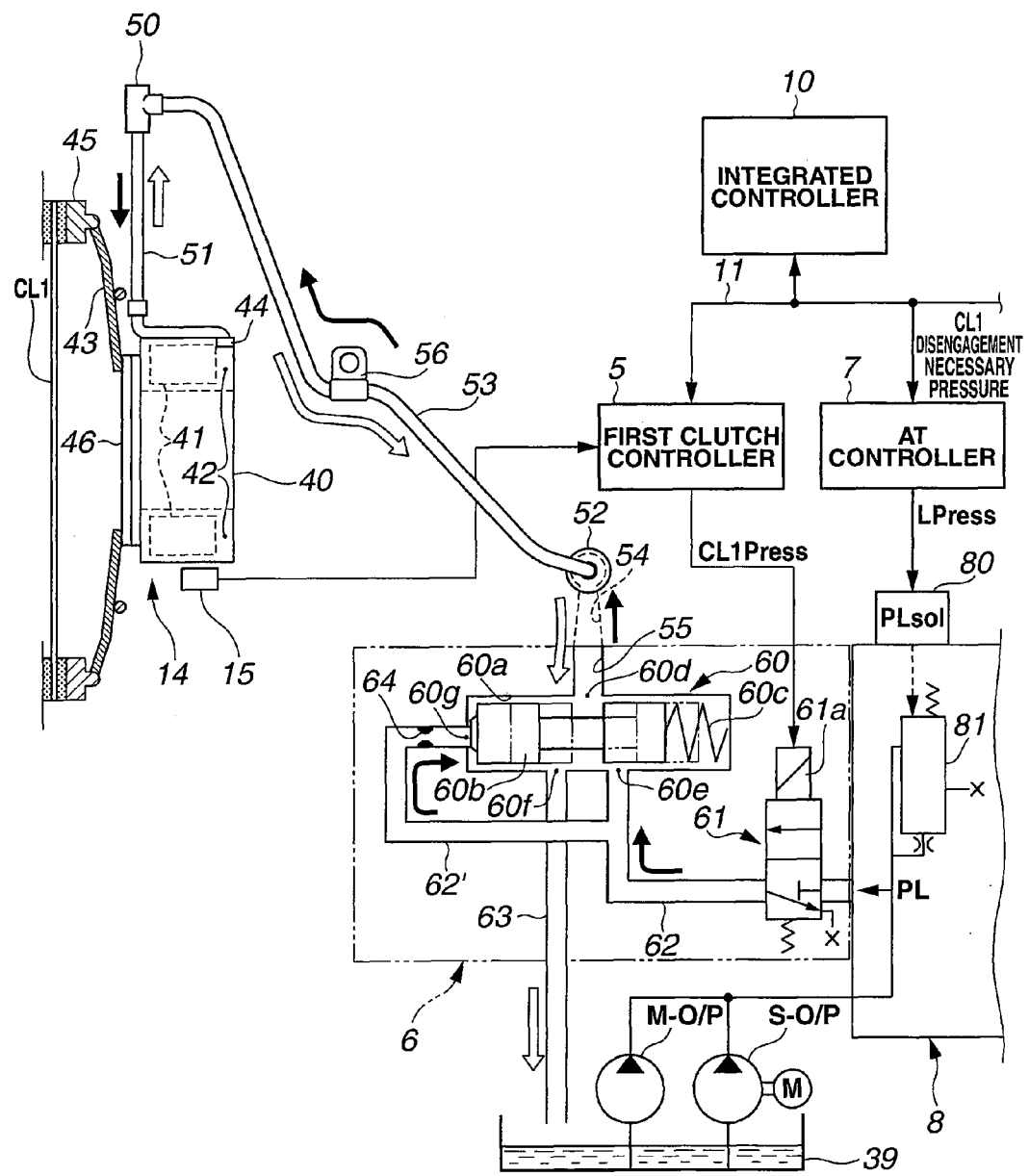
FIG. 4 is a first clutch hydraulic control system diagram showing a construction of a hydraulic control system and an electronic control system in the first embodiment which control the first clutch CL1 to come into engagement and disengagement.

As shown in FIG. 2 to FIG. 4, a hydraulic circuit to engage and disengage first clutch CL1 of the first embodiment includes first clutch hydraulic actuator 14 (clutch hydraulic actuator), first clutch hydraulic control valve 6 (clutch hydraulic control valve), AT control valve 8, main oil pump M-O/P, sub-oil pump S-O/P, and oil pan 39.

First clutch hydraulic actuator 14 is a CSC hydraulic actuator that controls engagement and disengagement of first clutch CL1. As shown in FIG. 2 and FIG. 4, first clutch hydraulic actuator 14 includes CSC piston 41 that slidably moves relative to CSC cylinder 40 upon carrying out engagement and disengagement of first clutch CL1, diaphragm spring 43 that biases CSC piston 41 in a direction in which a volume of CSC piston chamber 42 is decreased, and oil supply/discharge port 44 through which oil is supplied to CSC piston chamber 42 and discharged therefrom. One end side of diaphragm spring 43 is contacted with pressure ring 45, and the other end side of diaphragm spring 43 is contacted with CSC piston 41 through release bearing 46. That is, when no piston pressure is supplied to CSC cylinder 40, first clutch CL1 is held in full engagement by a biasing force of diaphragm spring 43. On the other hand, when a piston pressure is supplied to CSC cylinder 40, first clutch CL1 is controlled from slip engagement to full disengagement by controlling a stroke amount of CSC piston 41 that makes slide movement against the biasing force of diaphragm spring 43. Meanwhile, CSC is an abbreviation for "concentric slave cylinder".

As shown in FIG. 2 to FIG. 4, an oil passage that connects CSC piston chamber 42 of first clutch hydraulic actuator 14 with first clutch hydraulic control valve 6 is constituted of inner pipe 51 that extends from oil supply/discharge port 44 to pipe connector 50 to connect them with each other, outer pipe 53 that extends from pipe connector 50 to case mount portion 52 to connect them with each other, case inside oil passage 54 formed in transmission case 32 to communicate with outer pipe 53, and piston pressure oil passage 55 formed in first clutch hydraulic control valve 6 to communicate with case inside oil passage 54. Outer pipe 53 is supported at a mid-portion thereof on unit housing 30 by means of clip 56.

As shown in FIG. 4, first clutch hydraulic control valve 6 is a valve that produces the piston pressure to be supplied to CSC piston chamber 42 of first clutch hydraulic actuator 14, from line pressure PL as an original pressure. First clutch hydraulic control valve 6 includes spool valve 60 and solenoid valve 61.

Spool valve 60 is a valve that receives a valve input pressure as a valve actuating signal pressure outputted from solenoid valve 61, and makes changeover between a drain communication side and a CSC piston chamber communication side. Spool valve 60 includes spool 60b slidably moveable in valve bore 60a, spring 60c that biases spool 60b leftward in FIG. 4, and valve output pressure port 60d, valve input pressure port 60e, drain port 60f and valve actuating pressure port 60g which are formed in valve bore 60a. Valve output pressure port 60d is communicated with piston pressure oil passage 55. Valve input pressure port 60e is communicated with valve input pressure oil passage 62. Drain port 60f is communicated with drain oil passage 63. Valve actuating pressure port 60g is communicated with valve input pressure branch oil passage 62' in which orifice 64 is disposed.

Solenoid valve 61 produces a valve input pressure (i.e., a piston pressure) to be outputted to valve input pressure oil passage 62 from line pressure PL as an original pressure which is produced by AT control valve 8, by an ON/OFF duty operation based on piston pressure command value CL1Press that is outputted from first clutch controller 5 to valve solenoid 61a.

As shown in FIG. 4, AT control valve 8 includes line pressure solenoid 80 that produces a solenoid pressure to obtain the line pressure based on line pressure command value LPress outputted from AT controller 7, and pressure regulator valve 81 that regulates line pressure PL on the basis of a pump pressure as an original pressure and the solenoid pressure as a valve actuating signal pressure.

As shown in FIG. 4, an electronic control system for engaging and disengaging first clutch CL1 of the first embodiment includes first clutch controller 5, AT controller 7 and integrated controller 10.

In a case where the "HEV mode" as the running mode is selected, first clutch controller 5 allows first clutch CL1 to be engaged by the biasing force of diaphragm spring 43 by outputting piston pressure command value CL1Press (CL1Press=0) to solenoid valve 61 in accordance with an OFF command. Further, in a case where transition of the running mode from the "HEV mode" to the "EV mode" is carried out when running mode selecting conditions are fulfilled, for instance, when battery SOC is sufficient and accelerator opening APO is lower than a set threshold value, first clutch controller 5 executes first clutch disengagement control. Upon the first clutch disengagement control, first clutch CL1 is allowed to shift from the slip engagement state to the full disengagement state by outputting piston pressure command value CL1Press (CL1Press≠0) to solenoid valve 61, while monitoring piston stroke information outputted from piston stroke sensor 15. Further, when allowing first clutch CL1 to be in the full disengagement state, first clutch controller 5 supplies the piston pressure that is the line pressure PL regulated by pressure regulator valve 81 to CSC piston chamber 42 of first clutch hydraulic actuator 14 by outputting piston pressure command value CL1Press based on a 100% ON duty ratio to solenoid valve 61.

Figure 5:
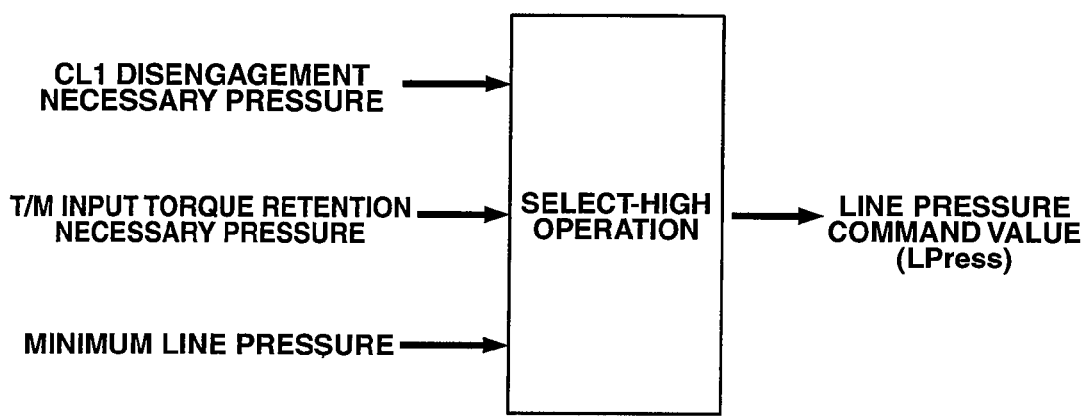
FIG. 5 is a block diagram showing a line pressure command value generation section which generates a line pressure command value upon line pressure control which is executed by an AT controller in the first embodiment.

AT controller 7 executes line pressure control by outputting line pressure command value LPress to line pressure solenoid 80. Upon the line pressure control, as shown in FIG. 5, AT controller 7 outputs line pressure command value LPress corresponding to a value that is determined by a select-high operation selecting the highest one of necessary pressure to disengage first clutch CL1 (i.e., CL1 disengagement necessary pressure), transmission input torque (i.e., T/M input torque retention necessary pressure, that is, necessary pressure to retain T/M input torque), and minimum line pressure. The "CL1 disengagement necessary pressure" is produced by integrated controller 10, and outputted to AT controller 7. The "T/M input torque retention necessary pressure" is predicted using accelerator opening information, etc. The "minimum line pressure" is determined on the basis of necessary pressures to ensure engagement and disengagement operation of friction engagement elements that are used in a shift operation in automatic transmission AT in a non-load condition. In a case where the "CL1 disengagement necessary pressure" is not selected, line pressure command value LPress determined by a select-high operation selecting the highest one of the "T/M input torque retention necessary pressure" and the "minimum line pressure" is outputted. The line pressure PL that is obtained from line pressure command value LPress is referred to as "reference line pressure". The "reference line pressure" is line pressure PL that is regulated over an entire period of time except for the disengagement time of first clutch CL1 in which the "CL1 disengagement necessary pressure" is selected. The "reference line pressure" is determined so as to ensure a shift operation except for the disengagement operation of first clutch CL1. That is, the "reference line pressure" is regulated in accordance with the accelerator opening, etc. as T/M input torque retention necessary pressure information. For instance, when the accelerator opening is zero, the reference line pressure is regulated to the minimum line pressure. As the accelerator opening becomes higher, the reference line pressure is regulated to a higher pressure.

Figure 6:
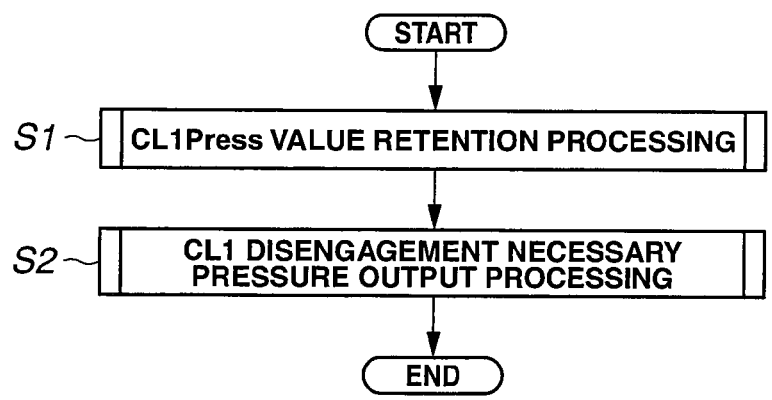
FIG. 6 is a main flow chart showing a flow of whole processing of generating and outputting a CL1 disengagement necessary pressure in accordance with retention of a piston pressure command value which is executed by an integrated controller in the first embodiment.

FIG. 6 is a main flow chart showing a flow of a whole processing of producing and outputting the CL1 disengagement necessary pressure in accordance with retaining the piston pressure command value, which is executed by integrated controller 10 in the first embodiment (clutch disengagement control section). Referring to FIG. 6, each of steps will be explained hereinafter.

In step S1, upon disengaging first clutch CL1, CL1Press value retention processing (FIG. 7) of retaining piston pressure command value CL1Press as a clutch disengagement necessary pressure signal which is outputted from first clutch controller 5 is executed. The flow proceeds to step S2.

In step S2, subsequent to the CL1Press value retention processing in step S1, CL1 disengagement necessary pressure output processing (FIG. 8) of producing the CL1 disengagement necessary pressure is executed. The flow proceeds to END.

Figure 7:
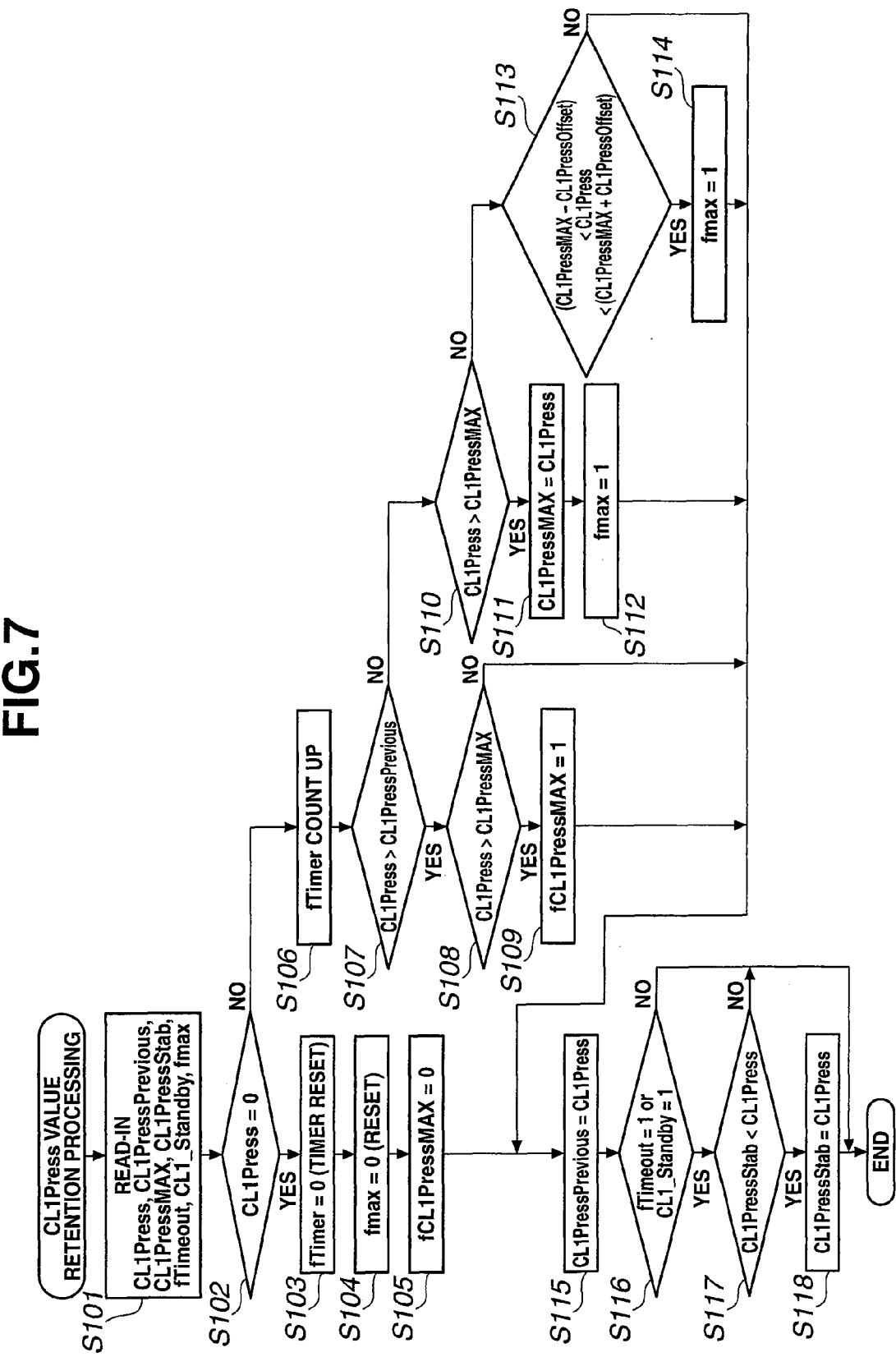
FIG. 7 is a flow chart showing a flow of CL1Press value retention processing which is executed by the integrated controller in the first embodiment.

FIG. 7 is a flow chart showing a flow of the CL1Press value retention processing that is executed by integrated controller 10 in the first embodiment (clutch disengagement control section). This processing is executed in order to retain piston pressure command value CL1Press that is outputted from first clutch controller 5. Referring to FIG. 7, each of steps will be explained hereinafter.

In step S101, piston pressure command value CL1Press, previous piston pressure command value CL1PressPrevious, maximum piston pressure retention value CL1PressMAX, stable piston pressure retention value CL1PressStab, predetermined elapsed time flag fTimeout, CL1 disengagement completion flag CL1_Standby, and maximum piston pressure flag fmax are read in. The flow proceeds to step S102. Piston pressure command value CL1Press is a read-in signal outputted from first clutch controller 5. An initial value of maximum piston pressure retention value CL1PressMAX is a value to obtain a minimum necessary pressure. An initial value of stable piston pressure retention value CL1PressStab is a value to obtain an optimal necessary pressure. Predetermined elapsed time flag fTimeout is rewritten to "1" when a time measured by timer fTimer exceeds a predetermined time (for instance, three seconds). Predetermined elapsed time flag fTimeout is returned to "0" when timer fTimer is reset. CL1 disengagement completion flag CL1_Standby is rewritten to "1" when first clutch CL1 is disengaged, and is returned to "0" when first clutch CL1 is engaged. Maximum piston pressure flag fmax is rewritten to "1" when piston pressure command value CL1Press has reached the MAX value, and is returned to "0" when piston pressure command value CL1Press becomes 0 kPa.

In step S102, subsequent to the read-in operation of necessary information in step S101, it is judged whether or not piston pressure command value CL1Press outputted from first clutch controller 5 is 0. If the answer to step S102 is yes (CL1Press=0), the flow proceeds to step S103. If the answer to step S102 is no (CL1Press≠0), the flow proceeds to step S106.

In step S103, subsequent to the judgment CL1Press=0 in step S102, timer fTimer is set to zero (timer reset). The flow proceeds to step S104.

In step S104, subsequent to the setting fTimer=0 in step S103, maximum piston pressure flag fmax is set to zero (reset). The flow proceeds to step S105.

In step S105, subsequent to the setting fmax=0 in step S104, maximum piston pressure retention value flag fCL1PressMAX is set to zero (reset). The flow proceeds to step S115. Maximum piston pressure retention value flag fCL1PressMAX is rewritten to "1" when piston pressure command value CL1Press has reached a maximum value, and is returned to "0" when piston pressure command value CL1Press is reset.

In step S106, subsequent to the judgment CL1Press≠0 in step S102, timer fTimer is allowed to count up. The flow proceeds to step S107.

In step S107, subsequent to the count up of fTimer in step S106, it is judged whether or not piston pressure command value CL1Press exceeds previous piston pressure command value CL1PressPrevious. If the answer to step S107 is yes (CL1Press>CL1PressPrevious), the flow proceeds to step S108. If the answer to step S107 is no (CL1Press≤CL1PressPrevious), the flow proceeds to step S110.

In step S108, subsequent to the judgment CL1Press>CL1PressPrevious in step S107, it is judged whether or not piston pressure command value CL1Press exceeds maximum piston pressure retention value CL1PressMAX. If the answer to step S108 is yes (CL1Press>CL1PressMAX), the flow proceeds to step S109.

If the answer to step S108 is no (CL1Press≤CL1PressMAX), the flow proceeds to step S115.

In step S109, subsequent to the judgment CL1Press>CL1PressMAX in step S108, maximum piston pressure retention value flag fCL1PressMAX is rewritten from "0" to "1". The flow proceeds to step S115.

In step S110, subsequent to the judgment CL1Press≤CL1PressPrevious in step S107, it is judged whether or not piston pressure command value CL1Press exceeds maximum piston pressure retention value CL1PressMAX. If the answer to step S110 is yes (CL1Press>CL1PressMAX), the flow proceeds to step S111. If the answer to step S110 is no (CL1Press≤CL1PressMAX), the flow proceeds to step S113.

In step S111, subsequent to the judgment CL1Press>CL1PressMAX in step S110, the piston pressure command value CL1Press read in at the current time is set to and retained as maximum piston pressure retention value CL1PressMAX. The flow proceeds to step S112.

In step S112, subsequent to the retention of maximum piston pressure retention value CL1PressMAX in step S111, maximum piston pressure flag fmax is rewritten from "0" to "1". The flow proceeds to step S115.

In step S113, subsequent to the judgment CL1Press≤CL1PressMAX in step S110, it is judged whether or not piston pressure command value CL1Press is within a range which extends from a value larger than a value obtained by subtracting piston pressure command value offset value CL1PressOffset from maximum piston pressure retention value CL1PressMAX to a value smaller than a value obtained by adding piston pressure command value offset value CL1PressOffset to maximum piston pressure retention value CL1PressMAX. If the answer to step S113 is yes (CL1PressMAX−CL1PressOffset<CL1Press<CL1PressMAX+CL1PressOffset), the flow proceeds to step S114. If the answer to step S113 is no (CL1PressMAX−CL1PressOffset≥CL1Press, or CL1PressMAX≥CL1Press+CL1PressOffset), the flow proceeds to step S115.

In step S114, subsequent to the judgment CL1Press−CL1PressOffset<CL1Press<CL1Press+CL1PressOffset in step S113, maximum piston pressure flag fmax is rewritten from "0" to "1". The flow proceeds to step S115.

In step S115, subsequent to any of step S105, the judgment of no in step S108, step S109, step S112, the judgment of no in step S113, and step S114, the piston pressure command value CL1Press read in at the current time is rewritten to previous piston pressure command value CL1PressPrevious. The flow proceeds to step S116.

In step S116, subsequent to the setting of previous piston pressure command value CL1PressPrevious in step S115, it is judged whether or not predetermined elapsed time flag fTimeout is 1 (i.e., the predetermined time has elapsed) or CL1 disengagement completion flag CL1_Standby is 1 (i.e., disengagement of first clutch CL1 has been completed). If the answer to step S116 is yes (fTimeout=1, or CL1_Standby=1), the flow proceeds to step S117. If the answer to step S116 is no (fTimeout=0, and CL1_Standby=0), the flow proceeds to END.

In step S117, subsequent to the judgment fTimeout=1, or CL1_Standby=1 in step S116, it is judged whether or not stable piston pressure retention value CL1PressStab is smaller than piston pressure command value CL1Press. If the answer to step S117 is yes (CL1PressStab<CL1Press), the flow proceeds to step S118. If the answer to step S117 is no (CL1PressStab≥CL1Press), the flow proceeds to END.

In step S118, subsequent to the judgment (CL1PressStab<CL1Press) in step S117, the piston pressure command value CL1Press read in at the current time is set to stable piston pressure retention value CL1PressStab. The flow proceeds to END.

Figure 8:
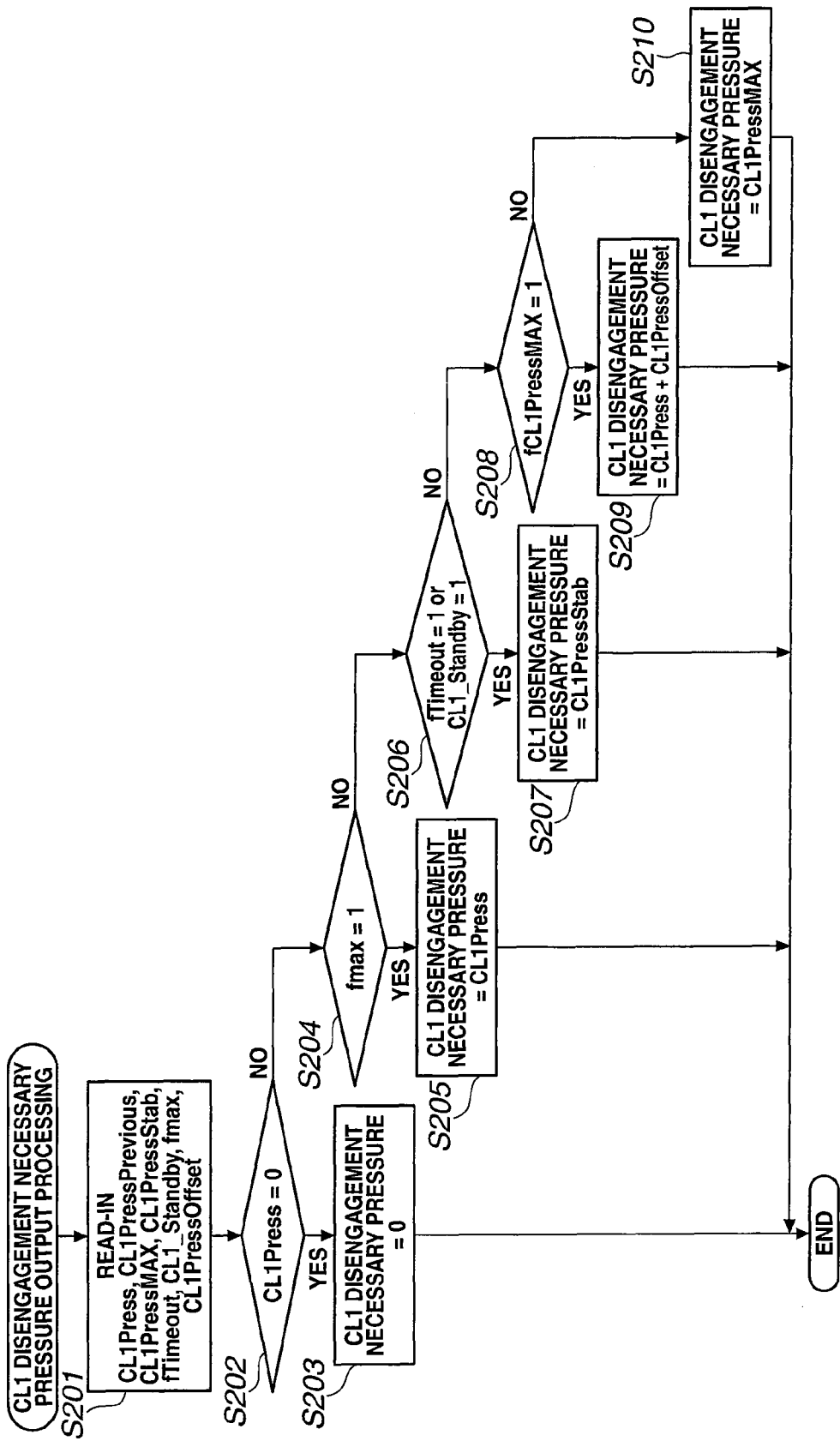
FIG. 8 is a flow chart showing a flow of CL1 disengagement necessary pressure output processing which is executed by the integrated controller in the first embodiment.

FIG. 8 is a flow chart showing a flow of the CL1 disengagement necessary pressure output processing that is executed by integrated controller 10 in the first embodiment (clutch disengagement control section). This processing is executed in order to reflect the CL1 disengagement necessary pressure on line pressure command value LPress. Referring to FIG. 8, each of steps will be explained hereinafter.

In step S201, piston pressure command value CL1Press, previous piston pressure command value CL1PressPrevious, maximum piston pressure retention value CL1PressMAX, stable piston pressure retention value CL1PressStab, predetermined elapsed time flag fTimeout, CL1 disengagement completion flag CL1_Standby, maximum piston pressure flag fmax, and piston pressure command value offset value CL1PressOffset are read in. The flow proceeds to step S202.

In step S202, subsequent to the read-in operation of necessary information in step S201, it is judged whether or not piston pressure command value CL1Press outputted from integrated controller 10 is 0. If the answer to step S202 is yes (CL1Press=0), the flow proceeds to step S203. If the answer to step S202 is no (CL1Press≠0), the flow proceeds to step S204.

In step S203, subsequent to the judgment CL1Press=0 in step S202, the CL1 disengagement necessary pressure is set to zero, this information "CL1 disengagement necessary pressure=0" is outputted to AT controller 7. The flow proceeds to END.

In step S204, subsequent to the judgment CL1Press≠0 in step S202, it is judged whether or not maximum piston pressure flag fmax is 1. If the answer to step S204 is yes (fmax=1), the flow proceeds to step S205. If the answer to step S204 is no (fmax=0), the flow proceeds to step S206.

In step S205, subsequent to the judgment fmax=1 in step S204, the CL1 disengagement necessary pressure is set to piston pressure command value CL1Press, and this information "CL1 disengagement necessary pressure=CL1Press" is outputted to AT controller 7. The flow proceeds to END.

In step S206, subsequent to the judgment fmax=0 in step S204, it is judged whether or not predetermined elapsed time flag fTimeout is 1 (i.e., the predetermined time has elapsed) or CL1 disengagement completion flag CL1_Standby is 1 (i.e., disengagement of first clutch CL1 has been completed). If the answer to step S206 is yes (fTimeout=1, or CL1_Standby=1), the flow proceeds to step S207. If the answer to step S206 is no (fTimeout=0, and CL1_Standby=0), the flow proceeds to step S208.

In step S207, subsequent to the judgment fTimeout=1, or CL1_Standby=1 in step S206, the CL1 disengagement necessary pressure is set to stable piston pressure retention value CL1PressStab, and this information "CL1 disengagement necessary pressure=CL1PressStab is outputted to AT controller 7. The flow proceeds to END.

In step S208, subsequent to the judgment fTimeout=0, and CL1_Standby=0 in step S206, it is judged whether or not maximum piston pressure retention value flag fCL1PressMAX is 1. If the answer to step S208 is yes (fCL1PressMAX=1), the flow proceeds to step S209. If the answer to step S208 is no (fCL1PressMAX=0), the flow proceeds to step S210.

In step S209, subsequent to the judgment fCL1PressMAX=1 in step S208, the CL1 disengagement necessary pressure is set to a value obtained by adding piston pressure command value offset value CL1PressOffset to piston pressure command value CL1Press, and this information "CL1 disengagement necessary pressure=CL1Press+CL1PressOffset" is outputted to AT controller 7. The flow proceeds to END.

In step S210, subsequent to the judgment fCL1PressMAX=0 in step S208, the CL1 disengagement necessary pressure is set to maximum piston pressure retention value CL1PressMAX, and this information "CL1 disengagement necessary pressure=CL1PressMAX" is outputted to AT controller 7. The flow proceeds to END.

Next, an operation of the control apparatus of a FR vehicle according to the first embodiment is explained. The operation is described individually with respect to "CL1Press value retention processing operation", "CL1 disengagement necessary pressure output processing operation", "first clutch disengagement control operation" and "line pressure increase control start timing setting operation".

[CL1Press Value Retention Processing Operation]

In a case where first clutch CL1 is in the engagement state by selecting the "HEV mode", piston pressure command value CL1Press is 0. Accordingly, in the flow chart as shown in FIG. 7, the flow successively proceeds to step S101, step S102, step S103, step S104, step S105, step S115, step S116 and END. In step S103, timer fTimer is set to 0 (timer reset). In step S104, maximum piston pressure flag fmax is set to 0 (reset). In step S105, maximum piston pressure retention value flag fCL1PressMAX is set to 0 (reset). Further, in step S115, the piston pressure command value CL1Press read-in at current time is rewritten to previous piston pressure command value CL1PressPrevious.

In accordance with transition from the "HEV mode" to the "EV mode", piston pressure command value CL1Press (≠0) is outputted from first clutch controller 5 so that increase in piston pressure is started in order to disengage first clutch CL1. In this condition, the flow that successively proceeds to step S101, step S102, step S106, step S107, step S108, step S115, step S116 and END in the flow chart as shown in FIG. 7, is repeated until piston pressure command value CL1Press exceeds maximum piston pressure retention value CL1PressMAX.

When piston pressure command value CL1Press exceeds maximum piston pressure retention value CL1PressMAX in accordance with a continuous increase in piston pressure command value CL1Press, the flow that successively proceeds to step S101, step S102, step S106, step S107, step S108, step S109, step S115, step S116 and END in the flow chart as shown in FIG. 7, is repeated. In step S109, maximum piston pressure retention value flag fCL1PressMAX is rewritten from "0" to "1".

In a case where piston pressure command value CL1Press is larger than maximum piston pressure retention value CL1PressMAX under a condition that the increase in piston pressure command value CL1Press is stopped and piston pressure command value CL1Press has changed toward a side on which the value CL1Press is hold or decreased, the flow that successively proceeds to step S101, step S102, step S106, step S107, step S110, step S111, step S112, step S115, step S16 and END in the flow chart as shown in FIG. 7, is repeated. In step S111, the piston pressure command value CL1Press read in at the current time is newly set to maximum piston pressure retention value CL1PressMAX and retained. In step S112, maximum piston pressure flag fmax is rewritten from "0" to "1".

On the other hand, in a case where piston pressure command value CL1Press is not larger than maximum piston pressure retention value CL1PressMAX and the following expression: "CL1Press−CL1PressOffset<CL1Press<CL1Press+CL1PressOffset" is satisfied when piston pressure command value CL1Press has changed toward the side on which the value CL1Press is hold or decreased, the flow that successively proceeds to step S101, step S102, step S106, step S107, step S110, step S113, step S114, step S115, step S116 and END in the flow chart as shown in FIG. 7, is repeated. In step S114, maximum piston pressure flag fmax is rewritten from "0" to "1". Further, in a case where the following expression: "CL1Press−CL1PressOffset<CL1Press<CL1Press+CL1PressOffset" is not satisfied, the flow that successively proceeds to step S101, step S102, step S106, step S107, step S110, step S113, step S115, step S116 and END in the flow chart as shown in FIG. 7, is repeated.

After that, in a case where the predetermined elapsed time condition is fulfilled (fTimeout=1) or the first clutch CL1 disengagement completion condition is fulfilled (CL1_Standby=1), and it is judged that stable piston pressure retention value CL1PressStab is smaller than piston pressure command value CL1Press, the flow proceeds from step S115 through step S116, step S117, step S118 to END in the flow chart as shown in FIG. 7. In step S118, the piston pressure command value CL1Press read in at the current time is set to stable piston pressure retention value CL1PressStab.

In this CL1Press value retention processing, a first function thereof is to compare piston pressure command value CL1Press outputted from first clutch controller 5 with a maximum value (CL1PressMAX) among past piston pressure command value CL1Press (step S110), and update maximum piston pressure retention value CL1PressMAX if CL1Press exceeds CL1PressMAX (step S111). For instance, if maximum piston pressure retention value CL1PressMAX is not updated, the conventional maximum value will be kept retained so that a needlessly high necessary pressure will be used. Further, a memory may be separately provided to continue memorizing the maximum value even at ignition-off time. However, in such a case, since the relationship between piston pressure command value and actual piston pressure is changed depending on a temperature condition, it is likely that a needlessly high necessary pressure is used. Therefore, it is desirable to suppress continuing memorizing the maximum value. In contrast, in the CL1Press value retention processing according to the first embodiment, a minimum value of the CL1 disengagement necessary pressure is to be used as an initial value of maximum piston pressure retention value CL1PressMAX, and maximum piston pressure retention value CL1PressMAX is to be reset at ignition-off time. As a result, it is possible to avoid using a needlessly high necessary pressure.

In this CL1Press value retention processing, a second function thereof is to retain stable piston pressure command value CL1Press after disengagement of first clutch CL1. In order to realize this function, in a case where the condition that CL1 disengagement completion flag CL1_Standby as a signal indicating the judgment of completion of first clutch CL1 disengagement becomes "1" after piston pressure command value CL1Press is started to increase by a request for disengagement of first clutch CL1, or the condition that predetermined elapsed time flag fTimeout as an internal arithmetic value becomes "1" after a certain time has elapsed from the time at which piston pressure command value CL1Press becomes a value larger than 0, is fulfilled, i.e., the OR condition is established (yes in step S116), and piston pressure command value CL1Press exceeds an initial value after becoming stable (yes in step S117), the value as the stable value is updated (step S118). It is desirable that CL1 disengagement completion flag CL1_Standby is outputted from first clutch controller 5 that includes piston stroke sensor 15 for first clutch CL1 and has a target value of CL1 disengagement stroke amount, and actually computes piston pressure command value CL1Press. Further, in a case where CL1 disengagement completion flag CL1_Standby indicating "1" is not outputted for a predetermined time, predetermined elapsed time flag fTimeout is used to hold piston pressure command value CL1Press at that time as a stable value. Therefore, it is actually undesired that predetermined elapsed time flag fTimeout other than "1" is outputted.

[CL1 Disengagement Necessary Pressure Output Processing Operation]

The CL1 disengagement necessary pressure output processing and the CL1Press value retention processing are simultaneously executed. In a case where first clutch CL1 is in the engagement state by selecting the "HEV mode", piston pressure command value CL1Press is 0. Accordingly, in the flow chart as shown in FIG. 8, the flow successively proceeds to step S201, step S202, step S203 and END. In step S203, the CL1 disengagement necessary pressure is set to zero, and this information "CL1 disengagement necessary pressure=0" is outputted to AT controller 7.

In a case where piston pressure command value CL1Press becomes nonzero (CL1Press≠0) and the following expressions: "fmax=0", "fTimeout=0", "CL1_Standby=0", "fCL1PressMax=0" are satisfied, the flow successively proceeds to step S201, step S202, step S204, step S206, step S208, step S210 and END in the flow chart as shown in FIG. 8. In step S210, the CL1 disengagement necessary pressure is set to maximum piston pressure retention value CL1PressMAX, and this information "CL1 disengagement necessary pressure=CL1PressMAX" is outputted to AT controller 7.

After that, when piston pressure command value CL1Press exceeds maximum piston pressure retention value CL1PressMAX, and maximum piston pressure retention value flag fCL1PressMAX is rewritten to 1 (fCL1PressMAX=1), the flow successively proceeds to step S201, step S202, step S204, step S206, step S208, step S209 and END in the flow chart as shown in FIG. 8. In step S209, the CL1 disengagement necessary pressure is set to a value obtained by adding piston pressure command value offset value CL1PressOffset to piston pressure command value CL1Press, and this information "CL1 disengagement necessary pressure=CL1Press+CL1PressOffset" is outputted to AT controller 7.

In a case where maximum piston pressure flag fmax is rewritten to 1 (fmax=1) when piston pressure command value CL1Press exceeds maximum piston pressure retention value CL1PressMAX or reaches approximately maximum piston pressure retention value CL1PressMAX, the flow successively proceeds to step S201, step S202, step S204, step S205 and END in the flow chart as shown in FIG. 8. In step S205, the CL1 disengagement necessary pressure is set to piston pressure command value CL1Press, and this information "CL1 disengagement necessary pressure=CL1Press" is outputted to AT controller 7.

In a case where the disengagement operation of first clutch CL1 has completed and first clutch CL1 is brought into the stable state, and the expression "fTimeout=1" (predetermined elapsed time condition) or the expression "CL1_Standby=1" (first clutch CL1 disengagement completion condition) is satisfied, the flow successively proceeds to step S201, step S202, step S204, step S206, step S207 and END in the flow chart as shown in FIG. 8. In step S207, the CL1 disengagement necessary pressure is set to stable piston pressure retention value CL1PressStab, and this information "CL1 disengagement necessary pressure=CL1PressStab" is outputted to AT controller 7.

In this CL1 disengagement necessary pressure output processing, a first function thereof resides in that when piston pressure command value CL1Press becomes higher than 0, maximum piston pressure retention value CL1PressMAX that is a maximum retention value is outputted as the "CL1 disengagement necessary pressure" (step S210). When the "CL1 disengagement necessary pressure" is thus outputted at the time at which piston pressure command value CL1Press becomes higher than 0, the "CL1 disengagement necessary pressure" is reflected on line pressure command value LPress such that pressure regulator valve 81 on an upstream side of main oil pump M-O/P, and sub-oil pump S-O/P are controlled to raise line pressure PL up to line pressure command value LPress. However, line pressure PL is not immediately raised in response to line pressure command value LPress, and line pressure PL is raised with a certain delay. The reasons therefor are oil temperature, increase in oil leakage amount which is caused by a clearance expanded due to variation and deterioration in components such as main oil pump M-O/P, pressure regulator valve 81, sub-oil pump S-O/P, etc., and the like. Accordingly, a rise in actual line pressure is advanced or retarded, and therefore, timing of raising line pressure command value LPress can be suitably advanced or retarded. However, if line pressure command value LPress is too early outputted, line pressure PL will become needlessly high to thereby increase a lubricating oil amount in automatic transmission AT. As a result, an increase in friction might be caused, thereby exerting an adverse influence upon fuel economy. Further, if line pressure command value LPress is too late outputted, an actual pressure may become lower than a necessary pressure for piston pressure command value CL1Press due to a delay between command pressure and actual pressure. As a result, there occurs a delay in disengagement time of first clutch CL1, and the like. In consideration of these risks, it is desired that when piston pressure command value CL1Press becomes higher than 0, line pressure command value LPress based on maximum piston pressure retention value CL1PressMAX as a MAX value is outputted.

In the CL1 disengagement necessary pressure output processing, a second function resides in that when piston pressure command value CL1Press exceeds a maximum value, the "CL1 disengagement necessary pressure" is reduced in accordance with piston pressure command value CL1Press (step S205, step S209). That is, since a delay between command pressure and actual pressure occurs, the "CL1 disengagement necessary pressure" itself to be used in the line pressure control is synchronized with piston pressure command value CL1Press in order to reduce an unnecessary line pressure as quick as possible. The judgment as to whether or not piston pressure command value CL1Press has reached a highest value is executed using internal flags that are maximum piston pressure flag fmax and maximum piston pressure retention value flag fCL1PressMAX in the flow chart as shown in FIG. 8.

In the CL1 disengagement necessary pressure output processing, a third function thereof resides in that when disengagement of first clutch CL1 has completed in accordance with piston pressure command value CL1Press, and first clutch CL1 is in the stable state, stable piston pressure retention value CL1PressStab that is a value to be retained as a stable value is commanded as the "CL1 disengagement necessary pressure" (step S207). As described above, the second function is to output piston pressure command value CL1Press as the "CL1 disengagement necessary pressure"

after piston pressure command value CL1Press becomes the highest value. However, in a case where maximum piston pressure flag fmax which is raised when piston pressure command value CL1Press has reached the highest value is "0", the highest value will continue to be outputted by the first function so that the line pressure is maintained high to thereby cause deterioration in fuel economy. Therefore, assuming that maximum piston pressure flag fmax does not become "1", the CL1 disengagement completion judgment is executed to output stable piston pressure retention value CL1PressStab in a case where the a condition that CL1 disengagement completion flag CL1_Standby that is transmitted from integrated controller 10 to AT controller 7 becomes "1", or the condition that predetermined elapsed time flag fTimeout as an internal arithmetic value becomes "1" after a certain time has elapsed from the time at which piston pressure command value CL1Press becomes a value larger than 0, i.e., the OR condition, is fulfilled, thereby suppress deterioration in fuel economy.

[First Clutch Disengagement Control Operation]

As described above, when the "CL1 disengagement necessary pressure" is outputted from integrated controller 10 to AT controller 7, in AT controller 7 to which the "CL1 disengagement necessary pressure" is inputted, line pressure command value LPress is generated by a select-high operation selecting the highest one of the "CL1 disengagement necessary pressure", the "T/M input torque retention necessary pressure" and the "minimum line pressure" as shown in FIG. 5. Line pressure command value LPress is then outputted to line pressure solenoid 80 to thereby execute line pressure control.

On the other hand, when the running mode judgment to shift from the "HEV mode" to "EV mode" is executed in integrated controller 10, the "CL1 disengagement command" is outputted from integrated controller 10 to first clutch controller 5. In first clutch controller 5 to which the "CL1 disengagement command" is inputted, piston pressure command value CL1Press is generated by feedback control to eliminate a difference between a target piston stroke and an actual piston stroke from piston stroke sensor 15. Piston pressure command value CL1Press is then outputted to solenoid valve 61 to thereby execute the first clutch disengagement control.

Figure 9:
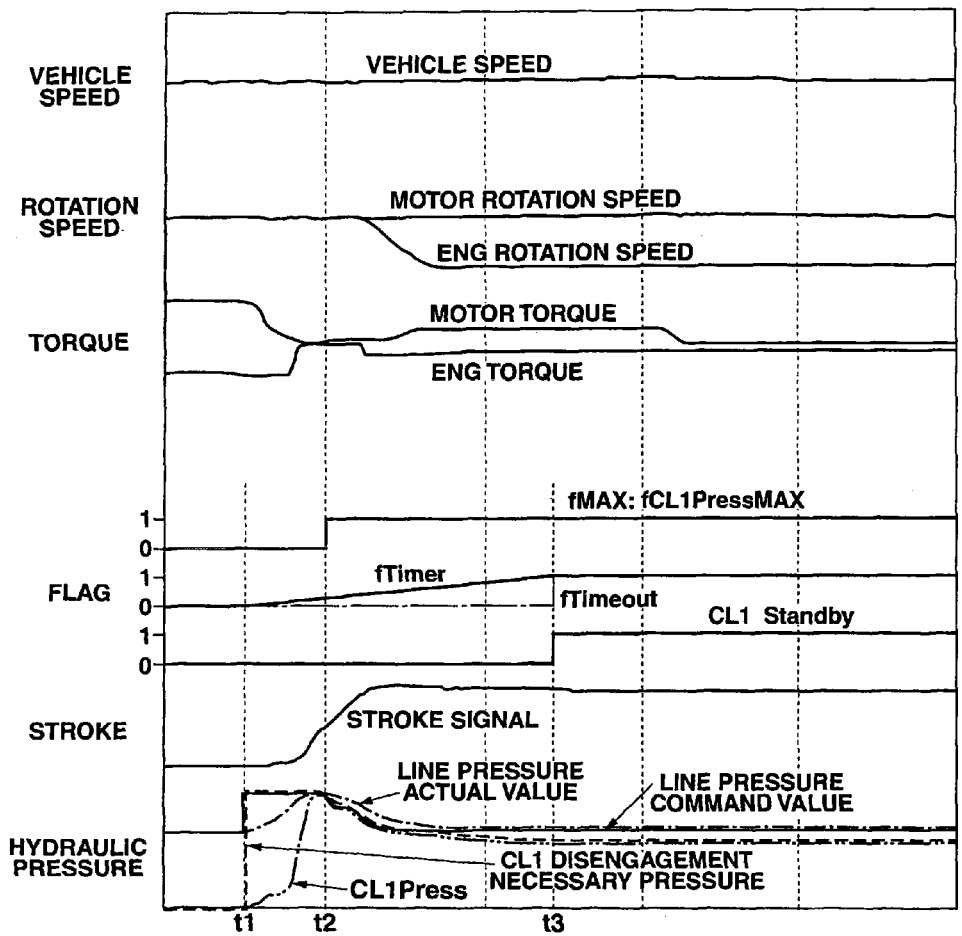
FIG. 9 is a time chart showing characteristics of vehicle speed, rotation speed (MG rotation speed, ENG rotation speed), torque (MG torque, ENG torque), flag (value of flags), stroke (piston stroke signal), and hydraulic pressure (line pressure command value, line pressure actual value, CL1 disengagement necessary pressure, CL1Press) for explanation of an example of a first clutch disengagement control operation in the FR hybrid vehicle in the first embodiment.

Accordingly, the first clutch disengagement control by monitoring the piston stroke is executed in cooperation with the line pressure increase control that is executed when the "CL1 disengagement necessary pressure" is selected upon the line pressure control. The first clutch disengagement control operation which is carried out upon disengaging first clutch CL1 in accordance with the judgment of mode transition from the "HEV mode" to the "EV mode" during the vehicle running at a constant speed, will be explained hereinafter by referring to a time chart as shown in FIG. 9.

At time t1, piston pressure command value CL1Press becomes 0, and the piston pressure begins to raise. In the same timing, i.e., at time t1, the "CL1 disengagement necessary pressure" based on maximum piston pressure retention value CL1PressMAX that is the past maximum retention value is outputted, and line pressure command value LPress corresponding to the "CL1 disengagement necessary pressure" is outputted. At time t2, the piston pressure becomes a maximum pressure, and piston pressure command value CL1Press exceeds maximum piston pressure retention value CL1PressMAX. After that, the "CL1 disengagement necessary pressure" is gradually reduced in accordance with gradual reduction of piston pressure command value CL1Press. From time t2 at which maximum piston pressure command value flag fCL1PressMAX is rewritten from "0" to "1" to time t3 at which the judgment of completion of disengagement of first clutch CL1 is made, line pressure command value LPress and line pressure actual value exhibit characteristics that they are gradually reduced in accordance with the gradual reduction of the "CL1 disengagement necessary pressure". At time t3 at which CL1 disengagement completion judgment flag CL1_Standby is rewritten from "0" to "1", stable piston pressure retention value CL1PressStab as the "CL1 disengagement necessary pressure" is outputted, so that line pressure command value LPress and line pressure actual value vary following the "CL1 disengagement necessary pressure" and exhibit a level-off characteristic.

Accordingly, in a case where a drop of the piston pressure is caused, for instance, due to deterioration in sealing properties of hydraulic components, etc., when disengaging first clutch CL1, there is gained an experience that the "CL1 disengagement necessary pressure" exceeds the reference line pressure determined by a select-high operation selecting the higher one of the "T/M input torque retention necessary pressure" and the "minimum line pressure". With this experience, when disengagement of first clutch CL1 is carried out at the next time or later, the line pressure increase control to increase the line pressure to a value higher than the reference line pressure in advance is started with a timing at least before the piston pressure reaches the reference line pressure. Thus, when the experience of lack of the line pressure is gained, learning control to previously start the line pressure increase control is executed on the basis of this experience. As a result, upon disengaging first clutch CL1, a delay in rise in the line pressure can be eliminated to thereby enhance a response of disengagement of first clutch CL1.

This line pressure increase control is started at least before the piston pressure reaches the reference line pressure, and ended by returning the line pressure to the reference line pressure when the piston pressure is dropped during the disengagement operation. That is, the line pressure increase control is not the control to shift the reference line pressure to an increase side thereof, but the control to temporarily increase the line pressure only with a necessary timing for a necessary time period. Therefore, even when the experience that the "CL1 disengagement necessary pressure" exceeds the reference line pressure is accumulated upon disengaging first clutch CL1, any change in setting the reference line pressure is not necessary, whereby any unnecessary energy loss can be suppressed as compared to a case where the reference line pressure is set high in expectation of an increment of the piston pressure.

[Operation of Setting Start Timing of Line Pressure Increase Control]

As described above, during the first clutch disengagement control, information on the "CL1 disengagement necessary pressure" is generated by integrated controller 10 and outputted to AT controller 7. In AT controller 7 to which the "CL1 disengagement necessary pressure" is inputted, the "CL1 disengagement necessary pressure" is selected to thereby determine line pressure command value LPress and execute the line pressure increase control.

Accordingly, the feature of the present invention basically resides in that the information on the "CL1 disengagement necessary pressure" generated by integrated controller 10 is presented to AT controller 7 only with a necessary timing for a necessary time period in order to suppress unnecessary energy loss and ensure the disengagement operation of first clutch CL1 with a good response. Therefore, it is important how to determine a timing of starting the presentation of the "CL1 disengagement necessary pressure" and a timing of ending the presentation thereof.

The timing of starting the presentation of the "CL1 disengagement necessary pressure" can be set to any timing within a time width that includes the timing of starting to increase the piston pressure and covers times before and after the timing of starting to increase the piston pressure. In this case, it is possible to fully ensure the "CL1 disengagement necessary pressure" by starting the line pressure increase control within the time width that straddles the timing of starting to increase the piston pressure in expectation of a response delay between line pressure command value LPress and the line pressure actual value. In a case where a timing of starting to increase the line pressure is set to before the timing of starting to increase the piston pressure (piston pressure command value CL1press), the line pressure can be increased in advance with a timing at which it is found that disengagement of first clutch CL1 (uncoupling of engine Eng and motor/generator MG) is necessary, for instance, with a timing of the judgment of mode transition to the "EV mode". Further, in a case where the timing of starting to increase the line pressure is set to after the timing of starting to increase the piston pressure (piston pressure command value CL1Press), the timing of starting to increase the line pressure can be afterward offset from the timing of starting to increase the piston pressure within such a range that the line pressure actual value is not lower than a piston pressure actual value in hydraulic curves as shown in FIG. 9. If the timing of starting to increase the line pressure is too late, a peak of the curve of the line pressure actual value will be retarded so that the piston pressure (CL1press) actual value cannot reach the "CL1 disengagement necessary pressure". The curve of increase in the line pressure actual value is variable depending on conditions such as a length of a hydraulic path, a viscosity of a working oil, etc. Therefore, in a case where the timing of starting to increase the line pressure is afterward offset from the timing of starting to increase the piston pressure, it is preferred to previously determine the timing of starting to increase the line pressure such that the piston pressure (CL1press) actual value surely reaches the line pressure actual value based on the "CL1 disengagement necessary pressure", by an experiment, etc.

In the first embodiment, commanding the "CL1 disengagement necessary pressure" is started (that is, the line pressure increase control is started) in conformity with the timing of starting to increase piston pressure command value CL1Press that indicates the piston pressure. The reason therefor is as follows. If line pressure command value LPress is increased before the timing of increasing piston pressure command value CL1Press, the line pressure will be increased even over a unnecessary time period, thereby causing an increase in lubricating oil amount which causes an increase in friction. As a result, an increase in energy loss will be caused. On the other hand, if line pressure command value LPress is increased after the timing of increasing piston pressure command value CL1Press, a rise in line pressure can be retarded to thereby suppress an increase in friction due to an increased lubricating oil amount which is caused due to an unnecessary increase in line pressure. As a result, energy loss can be reduced. However, there occurs a possibility of failing to ensure a necessary pressure to disengage first clutch CL1. In contrast, if line pressure command value LPress is increased at the same timing as the timing of increasing piston pressure command value CL1Press, these timings can be set at an optimal point without these risks such that a necessary pressure to disengage first clutch CL1 can be ensured without causing an increase in energy loss. Further, in the first embodiment, on the basis of the judgment of mode transition from the "EV mode" to "HEV mode", commanding the "CL1 disengagement necessary pressure" is to be ended (that is, the line pressure increase control is to be ended) in conformity with the timing at which piston pressure command value CL1Press is changed from nonzero (CL1Press≠0) to zero (CL1Press=0).

Next, effects that can be obtained in the control apparatus of a FR vehicle according to the first embodiment will be explained hereinafter.

(1) A control apparatus of a vehicle (FR hybrid vehicle) including a hydraulic clutch (first clutch CL1) disposed between a driving source (engine Eng) and left and right rear wheels RL, RR (driving wheels) and automatic transmission AT that is driven and controlled by a hydraulic pressure produced from line pressure PL as an original pressure, the hydraulic clutch (first clutch CL1) being actuated by a piston pressure that is produced from the line pressure as an original pressure by a clutch hydraulic control valve (first clutch hydraulic control valve 6), the hydraulic clutch being disengaged by operating a clutch hydraulic actuator (first clutch hydraulic actuator 14) to make stroke by controlling the piston pressure as a clutch disengagement hydraulic pressure such that an actual piston stroke position is conformed with a target position, the control apparatus including a clutch disengagement control section (FIG. 6, FIG. 7, FIG. 8) which is configured such that in a case where, upon disengaging the hydraulic clutch (first clutch CL1), there is gained an experience that a clutch disengagement necessary pressure exceeds a reference line pressure that is line pressure PL determined on the basis of a necessary hydraulic pressure to ensure an operation except for a disengagement operation of the hydraulic clutch (first clutch CL1), line pressure increase control to increase line pressure PL to a value higher than the reference line pressure in advance is started at least before the piston pressure reaches the reference line pressure when carrying out disengagement of the hydraulic clutch (first clutch CL1) at the next time or later, and line pressure PL is reduced when the piston pressure is reduced during this disengagement operation.

With this construction, when disengaging the clutch (first clutch CL1), it is possible to enhance a response of clutch disengagement regardless of variation in clutch disengagement necessary pressure (CL1 disengagement necessary pressure) while suppressing unnecessary energy loss.

(2) The clutch disengagement control section (FIG. 7, FIG. 8) is configured to set a timing of increasing line pressure PL within a predetermined time width that straddles a timing of starting to increase the piston pressure (piston pressure command value CL1Press). With this configuration, in addition to the above effect (1), it is possible to set the timing of increasing line pressure PL to a timing of ensuring a necessary pressure to disengage first clutch CL1 in expectation of a hydraulic response delay between line pressure command value LPress and a line pressure actual value.

(3) The clutch disengagement control section (FIG. 7, FIG. 8) is configured to set a timing of increasing line pressure PL in conformity with the timing of starting to increase the piston pressure (piston pressure command value CL1Press). With this configuration, in addition to the above effect (2), the timing of increasing line pressure PL can be set to an optimal timing in which the necessary pressure to disengage first clutch CL1 can be ensured without causing an increase in energy loss.

Although the control apparatus of a vehicle according to the present invention is explained above on the basis of the first embodiment, the specific construction of the present invention is not limited to the first embodiment. Variations and modifications of the first embodiment will be made without departing from the scope of the present invention which is defined with reference to the following claims.

In the first embodiment, the reference line pressure is determined on the basis of a necessary hydraulic pressure to ensure engagement and disengagement operations of a friction engagement element that is used upon shifting a speed in automatic transmission AT. However, in a case where a power split mechanism, a clutch mechanism, etc. except for an automatic transmission are disposed between the driving source and the driving wheels, the reference line pressure may be determined on the basis of a necessary hydraulic pressure to ensure an operation of these mechanisms.

In the first embodiment, the timing of starting the line pressure increase control is set in conformity with the timing of starting to increase a piston pressure command value (CL1Press). However, the timing of starting the line pressure increase control may be set within a predetermined time width that straddles the timing of starting to increase the piston pressure or the piston pressure command value CL1Press. That is, the timing of starting the line pressure increase control and the timing of ending the line pressure increase control are not particularly limited to those in the first embodiment if when carrying out disengagement of the hydraulic clutch, the line pressure increase control to increase the line pressure to a value higher than the reference line pressure in advance is started before the clutch disengagement hydraulic pressure reaches the reference line pressure, and the line pressure is returned to the reference line pressure when the piston pressure is reduced during this disengagement operation.

In the first embodiment, integrated controller 10 receives piston pressure command value CL1Press outputted from first clutch controller 5, generates the "CL1 disengagement necessary pressure", and transmits the generated "CL1 disengagement necessary pressure" to AT controller 7. However, first clutch controller 5 or AT controller 7 may be configured to generate the "CL1 disengagement necessary pressure" and execute the line pressure control.

In the first embodiment, the control apparatus is applied to the "1 motor+2 clutches" FR hybrid vehicle. However, the control apparatus may be applied to a "1 motor+2 clutches" FF hybrid vehicle. Further, the control apparatus may be applied to a hybrid vehicle in which second clutch CL2 and automatic transmission AT of the first embodiment are omitted. Further, the control apparatus may be applied to an electric vehicle and an engine vehicle each including a hydraulic clutch and any other hydraulically operating mechanism which are disposed between a driving source and driving wheels.

Figure 10:
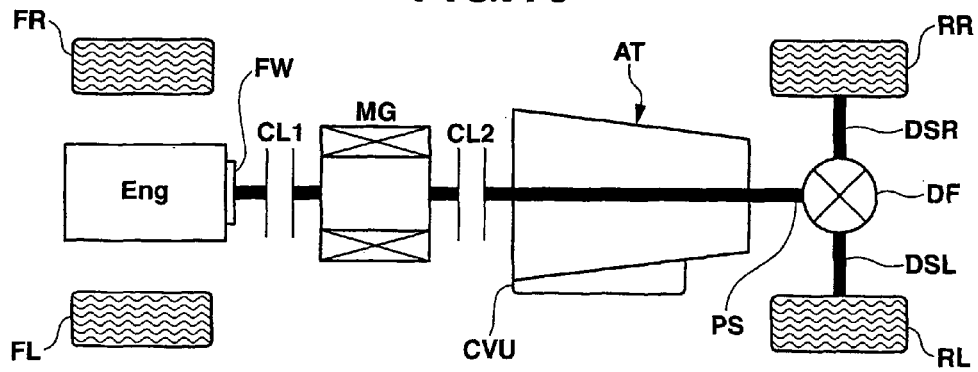
FIG. 10 is a drive line schematic diagram showing a drive line of a FR hybrid vehicle in which an independent second clutch is disposed between a motor/generator and a transmission.
Figure 11:
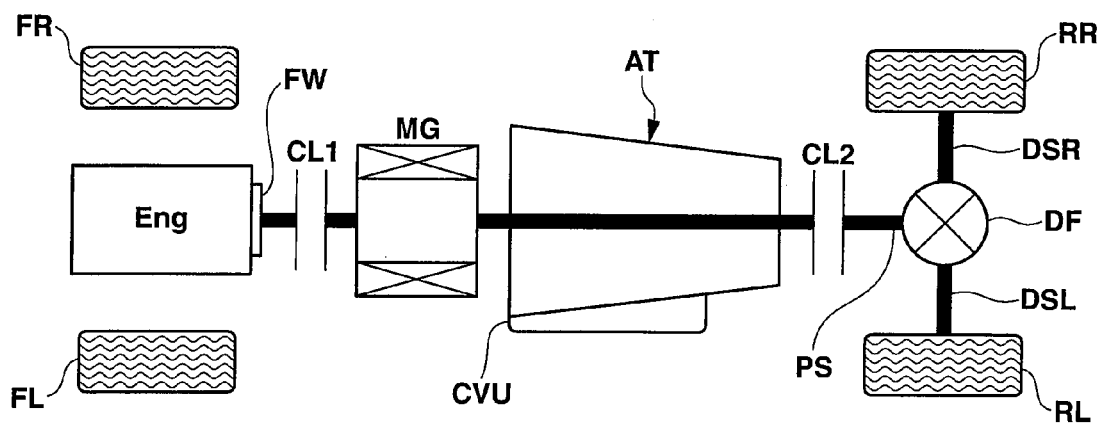
FIG. 11 is a drive line schematic diagram showing a drive line of a FR hybrid vehicle in which an independent second clutch is disposed between a transmission and driving wheels.

In the first embodiment, one of the friction engagement elements built in automatic transmission AT is used as second clutch CL2 that is a starting clutch. However, as shown in FIG. 10, independent second clutch CL2 may be arranged between motor/generator MG and automatic transmission AT. Further, as shown in FIG. 11, independent second clutch CL2 may be arranged between automatic transmission AT and driving wheels RL, RR.

As described above, in the control apparatus according to the present invention, in a case where a drop in piston pressure is caused, for instance, due to deterioration in sealing properties of hydraulic components, etc., upon disengaging the hydraulic clutch, there is gained an experience that the clutch disengagement necessary pressure exceeds the reference line pressure. With this experience, when disengagement of the hydraulic clutch is carried out at the next time or later, the line pressure increase control to increase the line pressure to a value higher than the reference line pressure in advance is started with a timing at least before the piston pressure reaches the reference line pressure. Thus, when the experience of lack of the line pressure is gained, the line pressure increase control is executed in accordance with learning control based on this experience. As a result, upon disengaging the clutch, a delay in rise in line pressure can be eliminated to thereby enhance a response of disengagement of the clutch.

This line pressure increase control is started at least before the piston pressure reaches the reference line pressure, and ended by reducing the line pressure when the piston pressure is reduced during the disengagement operation. That is, the line pressure increase control is the control to temporarily increase the line pressure only with a necessary timing for a necessary time period, but it is not the control to shift the reference line pressure itself to an increase side thereof. Therefore, even when the experience that the disengagement necessary pressure exceeds the reference line pressure is repeated and accumulated at the times of disengaging the clutch, any change in setting the reference line pressure is not necessary, and unnecessary energy loss can be suppressed as compared to a case where the reference line pressure is set high in expectation of an increment of the piston pressure. As a result, upon disengaging the clutch, a response of clutch disengagement can be enhanced regardless of variation in clutch disengagement necessary pressure, while suppressing unnecessary energy loss.

The invention claimed is:

1. A control apparatus of a vehicle including a driving source and an automatic transmission that is driven and controlled by a hydraulic pressure produced from a line pressure as an original pressure, the control apparatus comprising:
   a hydraulic clutch disposed between the driving source and the automatic transmission;
   a clutch hydraulic actuator including a piston;
   a clutch hydraulic control valve configured to produce a piston pressure from the line pressure as the original pressure, the piston pressure being applied to the piston, wherein the piston pressure is limited substantially to the line pressure;
   a clutch control section configured to operate the piston of the clutch hydraulic actuator to make a stroke to disengage the hydraulic clutch by controlling the piston pressure as a clutch disengagement hydraulic pressure such that an actual piston stroke position is conformed with a target position;
   an AT control section configured to determine a reference line pressure on the basis of a necessary hydraulic pressure to ensure an operation of the automatic transmission; and
   a clutch disengagement control section, which controls disengagement of the hydraulic clutch, configured to:
   upon receiving a clutch disengagement command and disengaging the hydraulic clutch, start line pressure increase control to increase the line pressure to a value higher than the reference line pressure at least before the piston pressure reaches the reference line pressure, and thereby allow the piston pressure to exceed the reference line pressure; and
   reduce the line pressure when the piston pressure is reduced during an operation of disengagement of the hydraulic clutch.

2. The control apparatus of a vehicle as claimed in claim 1, wherein the clutch disengagement control section is configured to set a timing of increasing the line pressure within a predetermined time width that straddles a timing of starting to increase the piston pressure.

3. The control apparatus of a vehicle as claimed in claim 2, wherein the clutch disengagement control section is configured to set the timing of increasing the line pressure in conformity with the timing of starting to increase the piston pressure.

4. The control apparatus as claimed in claim 1, wherein the AT control section is configured to determine the reference line pressure independently of operation of the hydraulic clutch.

\* \* \* \* \*